March 20, 1934.  H. HOLZWARTH  1,951,360
PORTABLE POWER PLANT FOR VEHICLES
Filed Jan. 30, 1931   2 Sheets-Sheet 1

Inventor
Hans Holzwarth.

March 20, 1934. H. HOLZWARTH 1,951,360
PORTABLE POWER PLANT FOR VEHICLES
Filed Jan. 30, 1931 2 Sheets-Sheet 2

INVENTOR
HANS HOLZWARTH
BY
Joseph Hirschman
ATTORNEY

Patented Mar. 20, 1934

1,951,360

UNITED STATES PATENT OFFICE 1,951,360

PORTABLE POWER PLANT FOR VEHICLES

Hans Holzwarth, Dusseldorf, Germany, assignor to Holzwarth Gas Turbine Co., San Francisco, Calif., a corporation of Delaware Application January 30, 1931, Serial No. 512,341
In Germany February 5, 1930

7 Claims. (Cl. 60—49)

The present invention relates to explosion turbine plants and has for its object to provide a plant of this type especially suited for vehicles and capable of being started while it is under load.

One of the important considerations associated with the design of power plants for vehicles, traction engines and the like, is that the power plant must be capable of starting the vehicle under load. When combustion engines were employed to drive such a machine there was made necessary the use of starting and switching couplings, or the conversion of the mechanical energy into hydraulic, pneumatic or electrical power. The devices heretofore constructed can however be regarded only as makeshift solutions of the problem because they exhibit numerous disadvantages and in particular suffer from the considerable loss involved in transforming the energy from one form to another.

The present invention has for its object to provide an explosion turbine plant which can be started under load without the necessity of transforming the available output of the machine into any other energy form. My invention is characterized by an arrangement wherein expansion engines are employed which are driven partly with a continuous stream of exhaust gases under pressure and partly with a continuous stream of steam under pressure, and which develop the available capacity of the plant, especially the power necessary to drive the vehicle. The exhaust gases and the steam are driving media which are delivered directly by an explosion turbine which drives the air compressor, such turbine being provided with devices for utilizing its excess or waste heat. The devices for utilizing such heat may preferably serve simultaneously as equalizing chambers for the exhausting gases, so that such gases may be conducted to the expansion machines in a continuous current, as contrasted with the puffs or jets of gases delivered by the explosion chambers of the explosion turbine to the rotor of such turbine. The expansion machines are preferably turbines; upon starting the vehicle such turbines may be operated by both driving media under full admission pressure so that they can develop the necessary starting torque.

Figure 1:
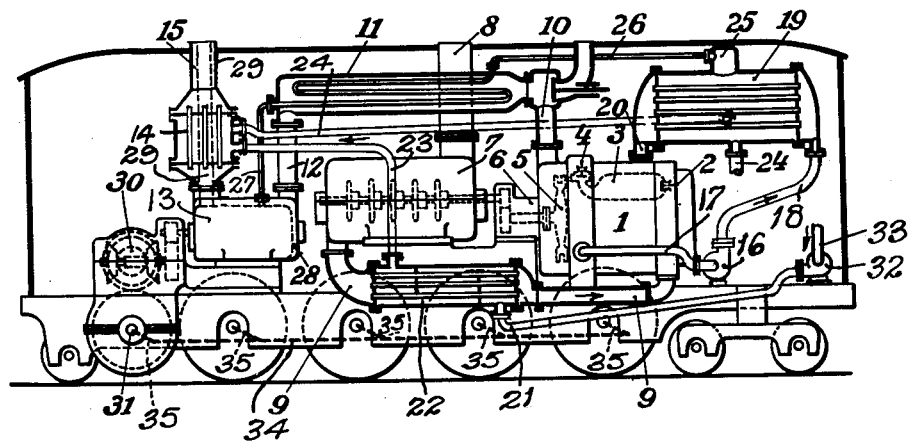
Figure 2:
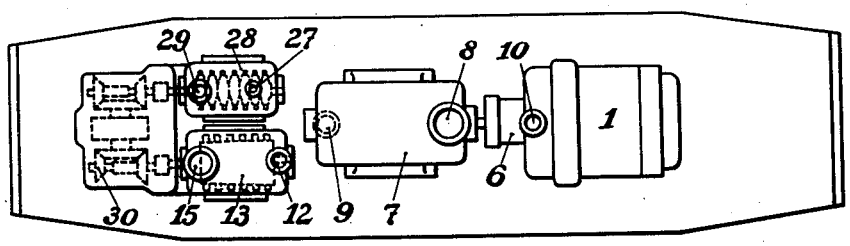
Figure 3:
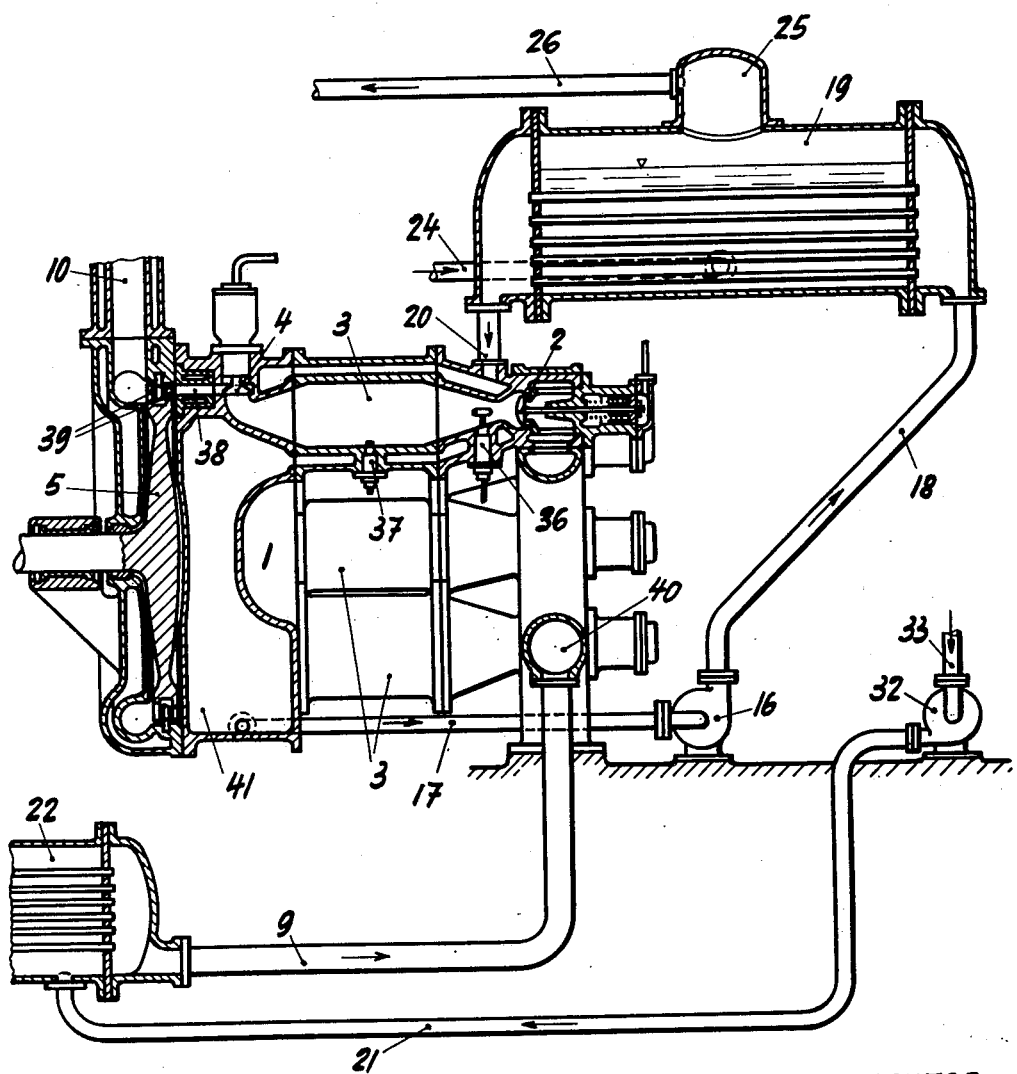

In the accompanying drawings is shown, by way of example, an embodiment of the invention in the form of a power plant for a locomotive. In said drawings, Fig. 1 is a schematic view in longitudinal section through the locomotive;

Fig. 2 is a plan view showing the machines mounted directly upon the base frame of the vehicle; and Fig. 3 shows a section through the explosion turbine and the cooling oil circuit on an enlarged scale.

The numeral 1 indicates an explosion turbine of the type which is illustrated in more detail in my United States Patent No. 877,194. This turbine includes a plurality of constant volume explosion chambers 3, four of which are shown in Fig. 3, which are fed with air and fuel through one or more inlet valves 2 and the injection apparatus 36. As soon as an explosive mixture is formed in the chamber 3 it is exploded at the proper instant by means of a spark plug 37 or other suitable igniting device. Shortly after the ignition, a suitably timed nozzle valve 4 is opened to permit the high temperature, high pressure explosion gases to discharge into an expansion nozzle 38 by which they are directed in puffs and at high velocity against a rotor 5 which may be in the form of a Curtis wheel provided with two rings of blades 39. The wheel 5 is connected through a transmission 6 with a compressor 7 which provides the compressed air which supports the explosions in chambers 3. The air for the compressor is sucked in through a conduit 8 and is conducted through a conduit 9 in compressed condition to a manifold 40 communicating with the air inlet valves 2 of the explosion chambers. The gases exhausting from the turbine 5 are conducted by pipe 10 to a heat exchanger 11; the latter is preferably of such size that after traversing the same the gases leave in the form of a continuous stream and pass through the conduit 12 to the combustion gas turbine 13. After giving up the rest of their available energy in such turbine 13, the gases are discharged into the atmosphere through the exhaust pipe 15.

All of the parts of the explosion turbine which are to be cooled are surrounded with a film of cooling oil circulating in cooling jackets to which is transmitted the excess or waste heat to keep the turbine parts from overheating. The heated oil streams from the various parts of the turbine are united in the chamber 41 into a single current which is withdrawn from the turbine jackets by the rotary pump 16 through conduit 17. The pump discharges the oil into a pipe 18 by which the oil is conveyed to a heat exchanger 19 built in the form of a steam boiler. After the cooling oil has given up the heat abstracted from the turbine, it flows through conduit 20 back to the cooling jackets of the turbine in which it again absorbs an amount of heat necessary to keep the turbine parts from exceeding a safe temperature, after which it is again charged into the boiler 19.

The boiler 19 is charged with feed water by a pipe 24, such water being preferably preheated as by the exhausted gases directly in the heat exchanger 14, or by heat abstracted from the turbine or compressor casing or from the compressed air in the heat exchanger 22, the water being conducted to the exchangers by the pump 32 which sucks the same from the conduit 33 and feeds it into conduit 21. The water is vaporized in the boiler and the steam collected in the dome 25 from which it is withdrawn by a pipe 26 and conveyed to the heat exchanger 11 through which, as stated above, flow the gases exhausting from the turbine 5, the steam being thus superheated by the exhaust gases. The superheated steam is conveyed by pipe 27 to a steam turbine 28 and after expansion therein is discharged through pipe 29 into the atmosphere. Both the continuous current gas turbine 13 and the steam turbine 28 deliver their power through a common bevel gear transmission 30 to a dummy axle 31 of the locomotive from which the drive wheels of the locomotive, coupled in fours through the connecting rod 34 and the cranks 35, are driven in known manner.

It will be clear from the above that in accordance with the present invention there are provided, in addition to the explosion turbine 1, the compressor 7, heat transfer apparatus 22 and 11, and continuous current turbines 13 and 28, so that the power output of the explosion turbine 1 is employed to drive directly the necessary air compressor without converting the energy from one form into another, while the highly heated exhaust gases of such turbine, which are still under pressure, are utilized after equalization of their pressure and without any conversion of their energy and resulting loss in output, as driving medium for a gas turbine, and the working steam delivered by such turbine, that is, generated in part with the excess or waste heat abstracted from the turbine, is employed as the driving medium for a steam turbine.

It will be noted that the energy for driving the vehicle is derived solely from the exploded combustion gases, and that the steam is generated or superheated with the heat energy abstracted either directly or indirectly from the explosion gases, the steam being directly superheated in the heat exchanger 11 while in the heat exchanger 14 the feed water is directly preheated by the exhaust gases but in the exchanger 22 receives heat which comes indirectly from the gases, and is vaporized in the boiler 19 with the aid of heat obtained from the gases indirectly through the medium of the cooling agent.

I claim:

1. An explosion power plant capable of starting under load without releasable couplings and suitable particularly for the drive of vehicles comprising an explosion turbine proper having a plurality of constant volume explosion chambers and an impulse rotor arranged to receive the puffs of partially expanded gases discharged by said chambers; an air compressor driven by said explosion turbine; a continuous current expansion engine connected with the exhaust space of the explosion turbine rotor and driven exclusively by exhaust gases under pressure; means for developing steam, means for conducting a fluid in heat-exchange relation with gas-heated parts of the explosion turbine, a conduit for leading such heated fluid into such steam developing means; a separate continuous current expansion engine connected with said steam developing means and driven exclusively by steam under pressure; a drive shaft; and a permanent coupling between said expansion engines and said shaft to deliver to the latter the available output of the plant.

2. A power plant as set forth in claim 1, wherein said expansion engines are in the form of turbines, and a common transmission for said turbines for delivering the power output of the latter to the said shaft.

3. An explosion turbine power plant for vehicles capable of starting under load and comprising an explosion turbine rotor and a constant volume explosion chamber adapted to generate successive puffs of explosion gases which are partially expanded in such turbine rotor, an air compressor driven by said turbine rotor, expansion engines mounted independently of said turbine rotor, means for equalizing the pressure of the gases exhausting from the turbine rotor, means for developing steam, means for conducting a fluid in heat-exchange relation with gas-heated parts of the plant, a conduit for leading such heated fluid into said steam developing means, conduits for conducting the gases and steam in continuous streams to said expansion engines, and transmission gearing between and permanently coupled with said engines and the driving axle of the vehicle.

4. A power plant as set forth in claim 3, wherein said expansion engines comprise gas and steam turbines.

5. A power plant as set forth in claim 3, wherein said expansion engines comprise gas and steam turbines, and wherein said transmission gearing is common to both such turbines.

6. An explosion turbine power plant for vehicles capable of starting under load and comprising an explosion turbine rotor and a constant volume explosion chamber adapted to generate successive puffs of explosion gases which are partially expanded in such turbine rotor, an air compressor driven by said turbine rotor, expansion engines mounted independently of said turbine rotor, means for equalizing the pressure of the gases exhausting from the turbine rotor, a steam boiler, a conduit for feeding water thereinto, a pump for circulating a cooling medium in heat-exchange relation with the heated parts of said explosion chamber and through said boiler, conduits for conducting the gases and steam in continuous streams to said expansion engines, and transmission gearing between and permanently coupled with said engines and the driving axle of the vehicle.

7. A power plant as set forth in claim 6, including a steam superheater coil in the path of the gases following the explosion turbine rotor, and a conduit connecting the boiler steam space with said superheater coil.

HANS HOLZWARTH.